United States Patent
McColgan et al.

(10) Patent No.: US 9,444,900 B2
(45) Date of Patent: Sep. 13, 2016

(54) SYSTEM AND METHOD FOR PROVIDING AND MANAGING A TARGET LIST ON BEHALF OF A USER AGENT CLIENT

(75) Inventors: Brian Edward Anthony McColgan, Mississauga (CA); Alexander Shatsky, Waterloo (CA); Gaelle Martin-Cocher, Mississauga (CA)

(73) Assignee: BlackBerry Limited, Waterloo (CA)

( * ) Notice: Subject to any disclaimer, the term of this patent is extended or adjusted under 35 U.S.C. 154(b) by 100 days.

(21) Appl. No.: 13/319,907

(22) PCT Filed: May 13, 2010

(86) PCT No.: PCT/CA2010/000731
§ 371 (c)(1),
(2), (4) Date: Jan. 20, 2012

(87) PCT Pub. No.: WO2010/130046
PCT Pub. Date: Nov. 18, 2010

(65) Prior Publication Data
US 2012/0117230 A1    May 10, 2012

Related U.S. Application Data

(60) Provisional application No. 61/177,954, filed on May 13, 2009.

(51) Int. Cl.
*G06F 15/173* (2006.01)
*H04L 29/08* (2006.01)
(Continued)

(52) U.S. Cl.
CPC .............. *H04L 67/24* (2013.01); *G06Q 10/06* (2013.01); *G06Q 10/10* (2013.01);
(Continued)

(58) Field of Classification Search
CPC . H04L 61/30; H04L 61/308; H04L 61/3085; H04L 61/309; H04L 12/1822; H04L 12/189
USPC .......................... 709/222, 223, 224, 225, 226
See application file for complete search history.

(56) References Cited

U.S. PATENT DOCUMENTS

| 7,254,579 B2 * | 8/2007 | Cabrera | ................... H04L 67/02 |
| 8,144,695 B2 * | 3/2012 | Bakker | ................... H04M 3/54 370/352 |

(Continued)

FOREIGN PATENT DOCUMENTS

| EP | 1587332 A | 10/2005 |
| WO | 2005096592 | 10/2005 |

OTHER PUBLICATIONS

"Condition Based URIs Selection Requirements" Candidate Version 1.0—Feb. 3, 2009, Open Mobile Alliance, OMA-RD-CBUS-V1_0-20090203-C (X) URL: http://member.openmobilealliance.org/ftp/Public_documents/COM/COM-CBUS/Permanent_documents/ (in particular, Sections 4, 5, 6.2.7, 6.2.9).

(Continued)

*Primary Examiner* — Dhairya A Patel
(74) *Attorney, Agent, or Firm* — Moffat & Co.

(57) ABSTRACT

A method and system for managing a target list on behalf of a user agent client, the method receiving a subscription request from the user agent client, the subscription request containing at least one uniform resource identifier identifying a resource; providing a subscription request to a an information owning enabler; receiving a notification containing information associated with a candidate uniform resource indicator set; evaluating information associated with the candidate uniform resource indicator set to create a selected uniform resource indicator set; and notifying the user agent client of the selected uniform resource indicator set.

11 Claims, 6 Drawing Sheets

(51) Int. Cl.
*G06Q 10/06* (2012.01)
*G06Q 10/10* (2012.01)
*H04L 12/18* (2006.01)
*H04L 29/12* (2006.01)
*H04W 4/08* (2009.01)

(52) U.S. Cl.
CPC .... *H04L 12/1822* (2013.01); *H04L 29/12754* (2013.01); *H04L 61/3085* (2013.01); *H04L 67/2819* (2013.01); *H04W 4/08* (2013.01); *H04L 12/189* (2013.01)

(56) References Cited

U.S. PATENT DOCUMENTS

| | | | |
|---|---|---|---|
| 2004/0202303 A1* | 10/2004 | Costa-Requena | H04M 3/56 379/205.01 |
| 2005/0260976 A1* | 11/2005 | Khartabil | H04M 3/56 455/416 |
| 2007/0192325 A1 | 8/2007 | Morris | |
| 2008/0009303 A1* | 1/2008 | Westman | H04L 12/1818 455/518 |
| 2008/0182548 A1* | 7/2008 | Pattison | H04L 69/08 455/406 |
| 2008/0183866 A1* | 7/2008 | Maeda | H04L 67/24 709/224 |
| 2008/0205267 A1* | 8/2008 | El Barachi | H04L 65/80 370/230 |
| 2008/0249997 A1* | 10/2008 | Sun | G06F 17/30587 |
| 2009/0094367 A1* | 4/2009 | Song | H04L 12/1818 709/227 |
| 2009/0210802 A1* | 8/2009 | Hawkins | G06F 3/0481 715/753 |
| 2009/0259646 A1* | 10/2009 | Fujita | G06F 17/3064 |
| 2009/0292766 A1* | 11/2009 | Morris | H04L 67/24 709/203 |

OTHER PUBLICATIONS

PCT application No. PCT/CA2010/000731, International Search Report mailed Sep. 1, 2010.
PCT application No. PCT/CA2010/000731, Written Opinion of the International Searching Authority mailed Sep. 1, 2010.
Office Action, Canadian Application No. 2,760,108, dated Nov. 25, 2013.
European Search Report on European Application No. 10774468.2, issued Jun. 12, 2014.
"Subscriptions to Request-Contained Resource Lists in the Session Initiation Protocol (SIP)," Camarillo et al., Internet Engineering Task Force, Geneva, Switzerland, Oct. 2008.
"Condition Based URIs Selection Architecture," Open Mobile Alliance Ltd., OMA-AD-CBUS-V1_0-20090511-D, Draft Version 1.1, May 11, 2009.
Canadian Intellectual Property Office, Office Action, Application No. 2,760,108, Dec. 5, 2014.
European Patent Office, Office Action on Application No. 10774468.2, Issued on Feb. 9, 2016.

* cited by examiner

SYSTEM AND METHOD FOR PROVIDING AND MANAGING A TARGET LIST ON BEHALF OF A USER AGENT CLIENT

RELATED APPLICATIONS

The present application is a national phase of PCT/CA2010/000731, filed May 13, 2010, which claims priority from US provisional application No. 61/177,954, filed May 13, 2009, the contents of all of which are incorporated herein by reference.

FIELD OF THE DISCLOSURE

The present disclosure relates to mobile communications sessions and in particular to the creation of groups for communications sessions.

BACKGROUND

The establishment of a communication session among one or more peers through mobile services on an ad-hoc basis may be difficult. In particular, various solutions exist for the creation of a group to facilitate communication among the group. However, these technologies do not provide for the enablement once the group is selected.

In particular, European patent application 1,587,332, discusses the use of rules to populate a dynamic group. However, once the dynamic group is created, the automatic and dynamic establishment of communications, the re-evaluation of the group and the setting of the service according to service/user specific states are not addressed.

The Open Mobile Alliance has defined a standardized solution, entitled "Condition Based URI Selection (CBUS) for the selection of communication partners based on conditions which are either pre-defined or ad-hoc in nature. The Open Mobile Alliance defines the CBUS enabler as originating from the need to support the functionality for features of the push-to-talk over cellular (PoC) service. Conditions are based on information elements related to users where the information content is typically changing over time, for example, presence status or geographic location. Other information may then be relevant including a user's personal interest, hobbies, or a combination of both volatile and static information. The Open Mobile Alliance OMA-RD-CBUS-V1_0-20090203-C CBUS specifications are incorporated herein by reference.

The CBUS platform, however, has no way to manage selected participants. If the CBUS platform were to manage selected participants, the CBUS server may take direct control of the selected uniform resource identifiers (URI's) to provide logic to construct or initiate the selected URIs as a group. Furthermore, in scenarios when candidate evaluation is ongoing, the updating information may cause problems in communications sessions such as potentially having to tear down the communication session in some instances.

BRIEF DESCRIPTION OF THE DRAWINGS

The present disclosure will be better understood with reference to the drawings in which.

DETAILED DESCRIPTION

Mobile device users may want the establishment of an ad-hoc communication session occasionally. For example, an employee working on a particularly difficult problem may want to discuss the problem with other employees of a company who have a certain technical knowledge and therefore wants to establish a conference call including all or a subset of those employees with the applicable knowledge. In order to do this, various conditions must be met. First, a condition exists that the people to be identified must be employees of the same company. Secondly, the people within the company must have a certain technical expertise. This may be determined, for example, by identifying the groups or departments that employees belong to, among other factors.

While the present disclosure describes the utilization of a results set for the establishment of a communications session, this is not limiting. Other uses for the results set may include various service settings including establishing a group for later resolution of a push advertising campaign. Another use would be establishing a converged address book subset (e.g. a social network group) or contact list based on the selected group members.

Also, to establish the conference call, the employee may need to be available, where available is a defined term as part of the Open Mobile Alliance (OMA) presence standards or as part of availability defined for another presence service (e.g. a Jabber presence platform). The ad hoc communication may be established by creating a group that meets the selected criteria and further permits changes to the group either through ongoing criteria matching and/or inputs from an outside source (e.g. a user selectively removing group members from those matching specified criteria).

In an alternative situation, a user may find that he or she has free time and may wish to find partners to go play golf. In this case, the conditions for the group being sought could include that the person is a friend, the person has a hobby of golf, that the person's presence indicates that they are available and that the person's location indicates that they are within a certain distance, for example 10 km, of the requesting party. Other examples of where ad-hoc communications are established would be known to those skilled in the art.

Figure 1:
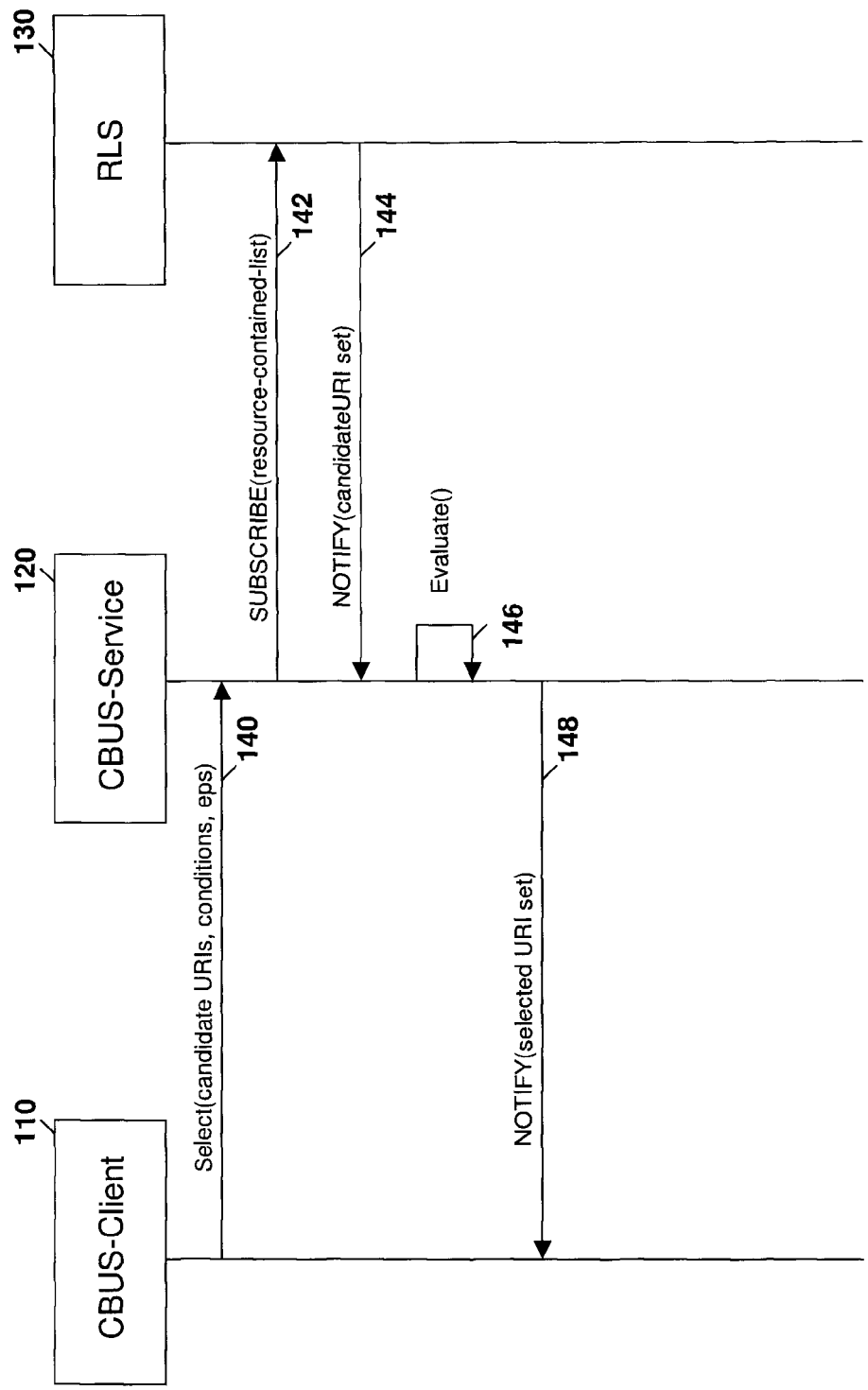
FIG. 1 is a data flow diagram showing communications between a CBUS client, CBUS service and RLS.

Reference is now made to FIG. 1. In FIG. 1, a CBUS-client 110 communicates with a CBUS-service 120. The CBUS-service 120 further communicates with a RLS (resource list server) 130. The RLS provides the CBUS-service 120 with back-end subscriptions for information owning enablers such as OMA presence or location service. In alternative embodiments, RLS 130 may be replaced by any other information owning elements throughout the present disclosure.

CBUS client 110 sends a message 140 to CBUS-service 120. Message 140 is an input (e.g. a selection or evaluate) request to CBUS-service 120 for a selected group of candidates for a communication session. In particular, message 140 indicates candidate uniform resource identifiers (URIs), as well as various conditions and/or evaluation parameters.

For example, a user "Bob" wishes to contact, through a voice over internet protocol (VoIP) conference call, several work colleagues who are "available" and have an interest/knowledge in Java programming to discuss a programming issue Bob has encountered in his Java software development project. Bob initiates the VoIP conference call from his client mobile device. Using the client 110, Bob selects or specifies conditions such as work colleagues, availability, interest and also establishes the evaluation parameters such as "available", "work", and "Java programming". These are sent in message 140 to CBUS-service 120. At CBUS-service 120, pre-processing may occur or the message is merely repackaged or transformed into a subscription containing a resource-contained-list set. The message, shown as message 142 in FIG. 1, is sent to the RLS 130.

RLS 130 may perform the back-end subscription(s) based on the information provided in message 142, and gathers the resulting notifications from information owning enablers (e.g. presence and location). The RLS subsequently generates a resource list metadata information (RLMI) document listing notification data for the resource contained list subscription. A candidate URI set which contains relevant evaluation information is then provided back to CBUS-service 120 through a notification, as shown by message 144. Specifically, RLS 130 generates a back-end subscription to one (or both) of presence and location for the resource contained list. As a result RLS 130 receives and aggregates the subsequent notifications received as part of those back-end subscription(s). The RLS 130 then aggregates the information into an RLMI document which forms all or part of message 144 (which contains the candidate URI set). That is the list of all or a portion of members of the input resource contained list, and their associated 'information' which is later used by CBUS service 120 for evaluation purposes The CBUS-service 120 uses the conditions and parameters from message 140 to evaluate the candidate URI set received in message 144. The evaluation is shown by arrow 146. Evaluation may include the matching of expressions (conditions) as expressed by client 110 for message 140.

The results of the evaluation, i.e. candidates that match specified conditions as specified or referred to by message 140, are placed in a "selected URI set" and a notification 148 is provided back to the client 110. Members of the "selected URI set" are considered target or matching URIs.

From the above, the OMA CBUS platform permits a mobile client to establish a list of candidate URI's representing a proposed communication partner or social networking sharing partner (e.g. a group). A series of conditions along with an associated set of evaluation parameters are provided as indicated above, and as a result of the CBUS request, the CBUS-service 120 evaluates conditions using the appropriate evaluation parameters against the information related to the input candidate URIs. CBUS-service 120 selects URIs for inclusion for the ad-hoc session when a condition is deemed to match. As a result of the candidate URI becoming a "selected URI", a notification, which may or may not be asynchronous, is generated towards the requesting client 110. The client then determines how to deal with the selected URIs. For example, client 110 may choose to generate an OMA extensible markup language (XML) document management (XDM) group document, describing a proposed "ad-hoc" communication session based on the selected URIs. In an alternative embodiment, client 110 may generate a contact list composed of Versitcard (vCard) entries. In yet another alternate embodiment, client 110 may choose to generate a direct invitation request to each member of the selected URIs (e.g. using a SIP:INVITE message as detailed in IETF RFC 3261).

The CBUS Enabler, however, has no means to manage selected participants to accomplish the management of selected participants at the CBUS server of CBUS service 120. The CBUS server of CBUS service 120, if managing the selected or target participants, may have to take direct control of the selected URIs and provide or support additional logic to construct or initiate the selected URIs as a group. Such functionality is not part of the scope of the CBUS Enabler version 1.0.

Further, in many situations, the "ad-hoc" communication sessions may have matching evaluations from a "candidate partner list" that may span hundreds or even thousands of users. For example, a corporate user in a large enterprise may be seeking an ad-hoc communication or exchange with partners (based on specified criteria) from a global address book having tens of thousands of users. Alternatively, a user may be seeking specific social networking contacts from a large list or database of users provided as part of a social networking community (e.g. Facebook™, LinkedIn™)

If selection is defined or specified as an ongoing process, the client 110 may receive a number of notifications in which the selected URI set changes over a period of time. The selected URI set may have eligible communication partners added or removed from previous notifications. This adds further complexity to the problem, given that the client must receive updated selections and deal with the changes appropriately on an ongoing basis. In some cases, changes in the selected URI set may result in a client having to tear down and/or reestablish communication sessions or it may result in client 110 having to reconstruct a contact list or group based on underlying deltas provided as part of the notification.

The present disclosure provides for the management of an ad-hoc communication session, exchange, or contact list based on a sequence of one or more candidate URIs that is part of the selected or target URI set which match selected criteria (conditions) relevant to the corresponding communication session or list. The present disclosure further provides for the management of a selected URI set based on ongoing removal (criteria not matched) and addition (criteria matched) of candidate URIs when the underlying selection mechanism is instructed to perform an ongoing evaluation of conditions against a set of candidate URIs.

The present disclosure further provides for the keeping of a user apprised of changes as well as support for the retrieval of the current selected URI set at any point in time. The present disclosure further permits changes to the ad-hoc group outside of the control of the CBUS server of CBUS service 120 but permitting the changes to still be reflected.

Figure 2:
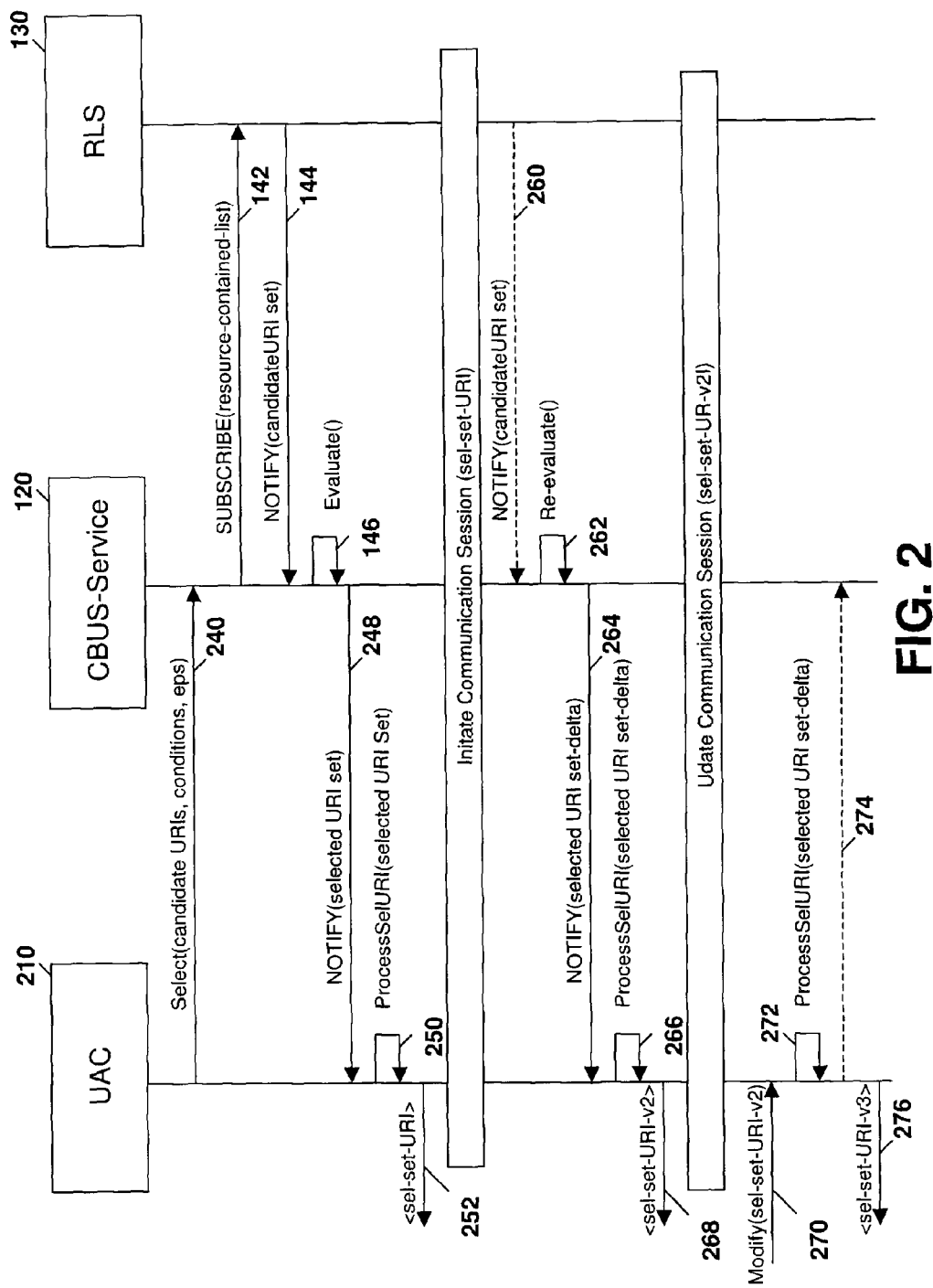
FIG. 2 is a data flow diagram showing processing of selected URI sets by a user agent client.

Reference is now made to FIG. 2. In FIG. 2, a user agent client (UAC) 210 communicates with the CBUS-service 120 and CBUS-service 120 communicates with RLS 130.

Message 240 is sent from UAC 210 to CBUS-service 120 and is similar to message 140 from FIG. 1. CBUS-service 120, upon receiving message 240, sends a subscription message 142 to RLS 130 and receives a notification 144 providing a candidate URI set.

An evaluation is performed, as shown by arrow 146, by CBUS-service 120 and a notification 248 containing selected or target URIs matching conditions, is sent back to UAC 210.

Once UAC 210 receives a selected URI set, UAC 210 takes responsibility for the establishment and management of the "selected URI set" or target URI on behalf of the client. The processing done by UAC 210 is shown as the ProcessSelURI arrow 250, and the establishment and/or transmission of the communication session is shown by arrow 252. For example, UAC 210 may establish an OMA XDM Group document, which defines a conference call including a selected set of URIs, individual selected member identities and a policy associated with the communication session. The policy may be either derived or overtly provisioned in one embodiment.

The processing of the selected URIs 250 results in a selected set URI, denoted as "sel-set-URI" arrow 252 in FIG. 2, and may be forwarded to a client and/or service in order to establish the actual communication. As will be appreciated by those skilled in the art, the 'sel-set-URI' represents an unfiltered set of targets. The URI may, for example, in the case where a conference call is being established, be sent or routed to a conference call server (e.g. via SIP-IP/Core by UAC 210) in order to establish the actual conference call (i.e. to invite all target URIs represented by the "sel-set-URI") on behalf of a user (e.g. user agent client (UAC) 210).

As will be appreciated by those skilled in the art, the subscription of message 142 can be a one-time subscription, a duration limited subscription, a subscription in which periodic checks are made and subscriptions refreshed, among other types of subscriptions. Further, it will also be appreciated by those skilled in the art that the subscription of message 142 may be issued by CBUS-service 120 directly to an information owning enabler (e.g. an OMA SIMPLE Presence platform). In scenarios where the evaluation is ongoing, after the initial request has been provided by UAC 210, it is possible for CBUS-service 120 to update or amend selected URI sets. As shown by notification 260, an amended candidate URI set may be provided containing updated information from an underlying information source, such as OMA SIMPLE Presence, for re-evaluation to CBUS service 120.

A re-evaluation, shown by arrow 262 is performed at CBUS-service 120 and as a result, it is deemed that an additional candidate (from the candidate URI set) now matches the specified condition. In an alternative embodiment, it may be determined by the re-evaluation shown by arrow 262 that candidates that were previously provided need to be removed (i.e. they no longer meet or match specified conditions).

As a result of the re-evaluation shown by arrow 262, one or more notifications are directed towards UAC 210, as shown by notification 264. Notification 264 can provide the 'amended' selected URI set in its entirety or, in one embodiment, could provide a delta showing only the difference between the previously provided URI set of notification 248 and the results provided by the evaluation of arrow 262. Thus, for example, the update may indicate adding Jane Doe as a candidate and removing John Smith from the selected URI set for Bob.

Notification 264 is received by UAC 210, and as a result the selected URI set is processed as shown by arrow 266. Based on the processing an appropriate action may occur. For example, the UAC 210 may, in certain situations, issue a session invitation to Jane Doe such as a SIP:INVITE message containing an optional "Join" header which refers to the dialogue to the currently ongoing communication session. This would result in Jane Doe being invited to the ongoing session already in progress (i.e. containing other participants matching Bob's original conditions). This eliminates potentially having to tear-down the entire communication session for the selected or target URIs in order to add or remove ammended communication partners.

Additional actions may also occur, including adding a user such as Jane Doe to the existing XDM group document. This may be achieved, for example, by the UAC 210 issuing an XCAP PUT operation to an OMA Group XDMS (XML Document Management Server). The order and type of action associated with the receipt of an update as detailed by arrow 266 may be specified through local policies accessible to UAC 210 or may be specified through previously configured rules executable by UAC 210 which define the associated logic or actions taken as a result of a change to the ad-hoc group.

Based on the predefined policies or the rules, the UAC 210 may determine that removing user John Smith from an in progress conference call is unnecessary and the user may simply be marked as "posthumously removed" via a subsequent XCAP PUT to the OMA XDM group document. Other actions may include doing nothing based on the termination that the in progress communication or that the ad-hoc group is no longer valid. The determination could be made based on monitoring by the UAC 210 or other network elements on behalf of the UAC to determine the state of the communication dialog or the status of the ad-hoc group.

The communication or update of the corresponding selection set URI is shown by arrow 268. Further, it will also be appreciated by those skilled in the art, that the updated selected URI set may also be fetched or retrieved by a client or application, as shown by arrow 268.

In a further embodiment, UAC 210 may also provide a client with information, including the overt ad-hoc list or an opaque handle to a selected set of URIs, permitting a user client to display or review the current ad-hoc group at any point in time. An opaque handle, in the present embodiment could be a URI representing the list. UAC 210 may accept additional inputs such as those outside the scope of the normal evaluation path to achieve the addition or removal of members not subject to normal conditions of the evaluation matching.

Thus, for example, if the selected URI set returned by message 248 contains a number of potential golf players that may be located nearby and available, the user could be provided with the selected URI set to allow the user to go through the names and determine whether any names should be removed or excluded from the list. Thus, for example, John Smith may not be a compatible pairing with Jane Doe and the user may remove one of the two players to avoid conflicts on the golf course.

Referring to FIG. 2, the modification of the list is provided by arrow 270 to UAC 210. In response to receiving the modification by arrow 270, UAC 210 processes the modified set, as shown by arrow 272. The processing at arrow 272 may result in additional communications. For example, indirect communications to the CBUS-service 120 may result, as shown by arrow 274 (i.e. to remove a candidate from further consideration or matching). Further updates may also be provided to the various communication clients such as the conference call server, the user, or other recipients, as shown by arrow 276.

With the modification as shown by arrow 270, UAC 210 may be aware of an evaluation-duration, if any, specified by the selection 240 and adjust the scope of the evaluation-duration accordingly for use with other services (e.g. to a CBUS service 120).

Figure 3:
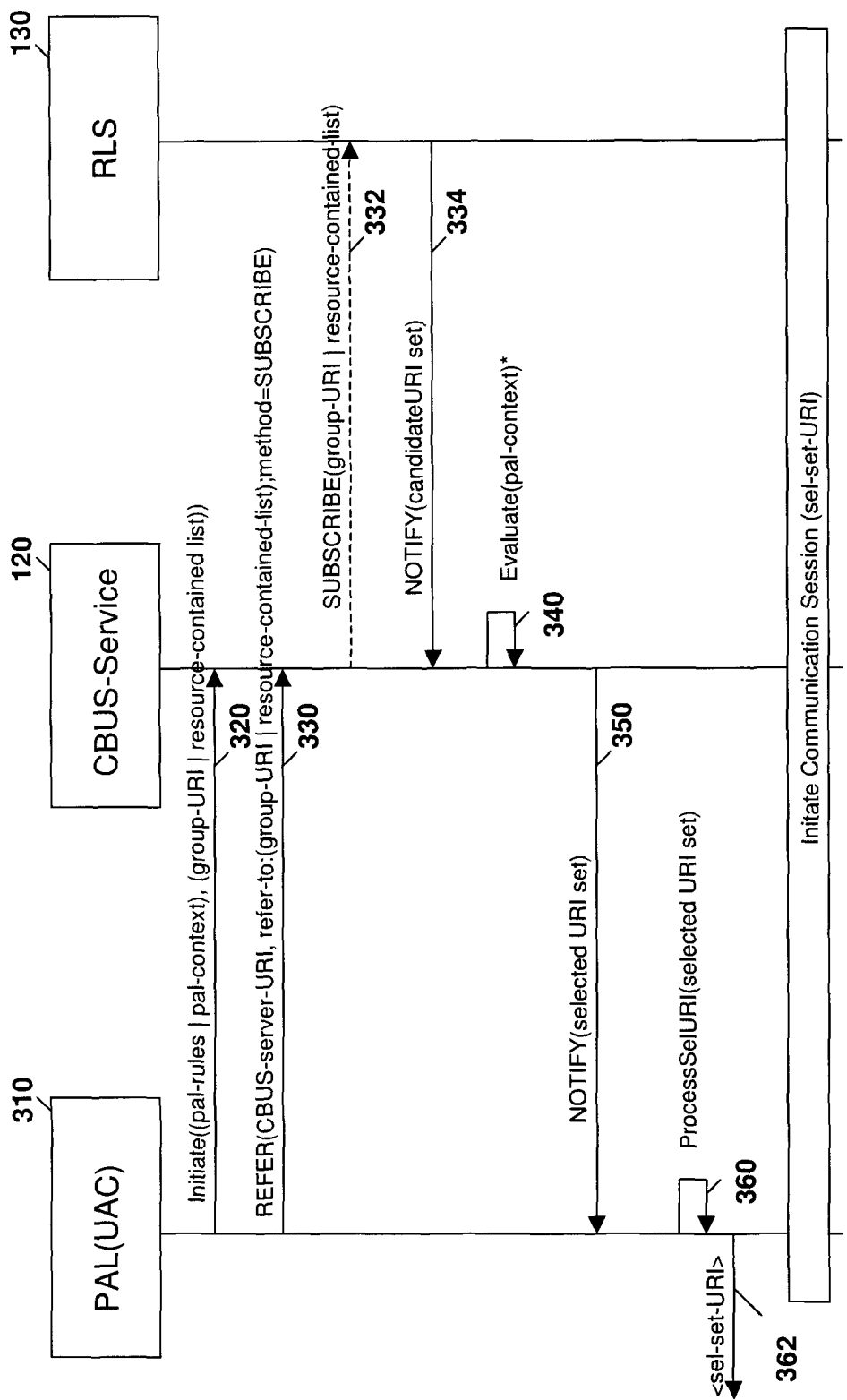
FIG. 3 is a data flow diagram showing processing of selected URI sets in which the user agent client is a presence abstraction layer and in which a SIP:REFER request is utilized.

Referring to FIG. 3, an alternative embodiment shows that the UAC may be manifested as a presence aware layer (PAL) service and may indirectly manage the group on behalf of the underlying back-end infrastructure. As used herein, PAL is a subset of a Context Aware Layer, which is a layer that may be an access, application abstraction or proxy layer. The layer may make use of aspects. This layer may be deployed over a network and may be adapted to handle requests from a plurality of clients of various types. This layer may include context aware mechanisms such as, for example an x/CAM, which is a non-specific (generic) context aware mechanism, or specific mechanisms such as presence (p/CAM) and location (L/CAM).

In FIG. 3, PAL (UAC) 310 communicates with CBUS-service 120, which communicates with RLS 130.

An initiate or start message 320 allows the PAL (UAC) 310 to initiate a request towards the CBUS service 120, including providing candidate URIs along with rules or associated contexts established by the presence access layer.

As will be appreciated, the URI could either be a URI for a specific individual or it could be a group URI, which is a group identity associated with a group of individuals (e.g. a SIP or TEL URI, or presence contained list).

As used herein, context is defined as "the set of information which surrounds, and gives meaning to something else". Examples of context can be found, for example, in presence applications, location applications, among others.

Rules reside within or are referred to by a presence context and establish a sequence of steps or logic flows that may be needed to compute presence aspects based on the metadata provided by the underlying presence platform. Rules are conceptually similar to database stored procedures or user defined functions (UDFs). Base or default presence rules may be changed or supplemented by an application client or an individual user. For example, the injection by a client of dynamic rules may override or extend base rule behavior. In addition, rules incorporate policies associated with the presence context by the application or the enabler to augment or provide hints surrounding the interpretation of metadata. This permits an application or service to directly affect the outcome of one or more presence aspects.

Similarly, rules could apply for location contexts or other generic contexts (e.g. a combination of location and presence contexts).

The initiate call 320 illustrates passing a PAL context to the CBUS-Service 120. Binding information and policy values associated with the established PAL context are transported or indicated to the CBUS-service 120, as shown by the following example:

```
MESSAGE sip:cbus.domain.com SIP/2.0
Via: SIP/2.0/UDP xyz.domain.com;branch=z9hG4bK776sgdkse
Max-Forwards: 70
To: <sip:cbus@domain.com>
From: <sip:uac@domain.com>;tag=193402342
Call-ID: 898234234@agenta.domain.com
CSeq: 1234 MESSAGE
Content-Type: application/pal-caps+xml
Content-Length: xxx
<?xml version="1.0" encoding="UTF-8"?>
<service id="ConfCallService"
    version="1.0"
    presence-context-id="ahG78ecfg1"
    evaluation="one-time"
    bindings="xml:rpc"
```
```
    wsdl="http://www.openmobilealliance.org/pal/wsdl">
</service>
```

After the initiation with the rules context and group URI, a subscription 330 is provided to CBUS service 120 from PAL (UAC) 310. In the embodiment of FIG. 3, the subscribe is a referral, as outlined in the IETF and OMA standards, causing CBUS-service 120 to subscribe to RLS 130. The benefit of using a referral is that the notification that is returned in response to a referral is returned to the originating party, which in this case is the PAL (UAC) 310, thereby providing the benefit that PAL (UAC) 310 is able to receive notifications of status of the underlying transaction. That is, the CBUS subscription/evaluation/matching/selection transaction provides a result which is equivalent to the selected URI set notification delivered by message 248 and/or message 264 of FIG. 2. The REFER mechanism is outlined in the Internet Engineering Task Force (IETF) Request for Comments (RFC) 3515, the contents of which are incorporated herein by reference.

An example of a SIP:REFER message corresponding to the subscription 330 is as follows:

```
REFER sip:cbus.domain.com SIP/2.0
Call-ID: 898234234@agenta.domain.com
CSeq: 5678 REFER
Max-Forwards: 70
Via: SIP/2.0/UDP xyz.domain.com;branch=z9hG4bK776sgdksf
To: <sip:cbus@domain.com>
From: <sip:uac@domain.com>;tag=193402343
Refer-To: <sip:golfbuddies@domain.com?Event=presence&Accept=
application/pidf+xml%2Capplication/rlmi+xml%2Cmultipart/related;
method=SUBSCRIBE>
Contact: sip:uac@domain.com
Content-Length: 0
```

In another embodiment, it will be appreciated by those skilled in the art that PAL (UAC) 310 may include the 'Refer-Sub: false' header in the SIP:REFER message corresponding to the subscription 330 as detailed in IETF RFC 4488. This would have the net-effect of eliminating the generation of message 350. This mechanism may use some other mechansim by which the PAL (UAC) 310 and CBUS-Service 120 would exchange information (e.g. a sequence of HTTP request/response protocol messages between the two functional entities for exchanging selected URI set(s)).

Triggered by the REFER, a subscription 332 is sent to RLS 130 from CBUS service 120 and RLS 130 compiles and aggregates the information and provides this back to CBUS service 120 as a notification 334. IETF RFC 4662 provides examples of such subscriptions and the corresponding notifications provided by an RLS.

CBUS service 120 then evaluates the candidate URI set provided in notification 334 as shown by arrow 340. In the embodiment of FIG. 3, the evaluation at arrow 340 utilizes the PAL-rules and/or PAL-context provided in the initiation message 320 to allow CBUS-service 120 to derive accurate results for various presence related information. This provides the advantage that uniform results are determined for aspects such as "available", "reachable", "willing", among others. Thus the evaluation at arrow 340 would involve an invocation by the CBUS Server to evaluate (based on overt rules and/or context which references to or supplies rules from a PAL(UAC) 310) in order to determine whether members match (i.e. of golfbuddies@domain.com matches conditions). For example, bob@domain.com (a member of this golfing buddy list) is a 'candidate URI', therefore CBUS Server must determine (as part of contextual conditions established by UAC 310) that he is 'willing' to communicate based on PAL rule 'pal:willingness'. CBUS Server of CBUS service 120 executes this rule on behalf of PAL(UAC) 310 to establish whether the candidate belongs to the selection URI set.

In an alternative embodiment, the evaluation as shown by arrow 340 could involve communication between CBUS service 120 and PAL (UAC) 310 wherein the raw presence data is provided from CBUS-service 120 to PAL 310 to allow PAL 310 to process the presence information based on overt rules and/or context, and return the various presence aspects to CBUS-service 120.

As a result of the evaluation shown by arrow 340, a notification providing selected or target URI sets is provided to PAL (UAC) 310 as shown by arrow 350. This would be candidate URIs matching specified conditions as specified by the initiation message 320.

The selected URI set is then processed as shown by arrow 360 and the selected set URI may be communicated to a communications enabler or to the client as shown by the arrow 362.

The processing shown by arrow 360 continues previous processing at the CBUS-service 120, shown by arrow 340. Further, PAL (UAC) 310 may execute further actions based for example on the selected URI set notification received as all or part of the PAL presence aspect 'eligible-session-participants' (i.e. certain presentities matching specified criteria as set out by the initiation message 320). In this scenario, PAL (UAC) 310 may execute a specified action based on rules (e.g. transform the selected URI set into a vCard list for later sharing as a Microsoft Outlook contact list) on behalf of a requesting user. In addition, the PAL (UAC) 310 may, for example, establish a service URI list, such as for conference calling, or PAL (UAC) 310 may simply present or return the enumerated list back to the requesting user. This would allow a user to narrow the list, by for example, selecting a subset of participants, and initiating a communication session.

Figure 4:
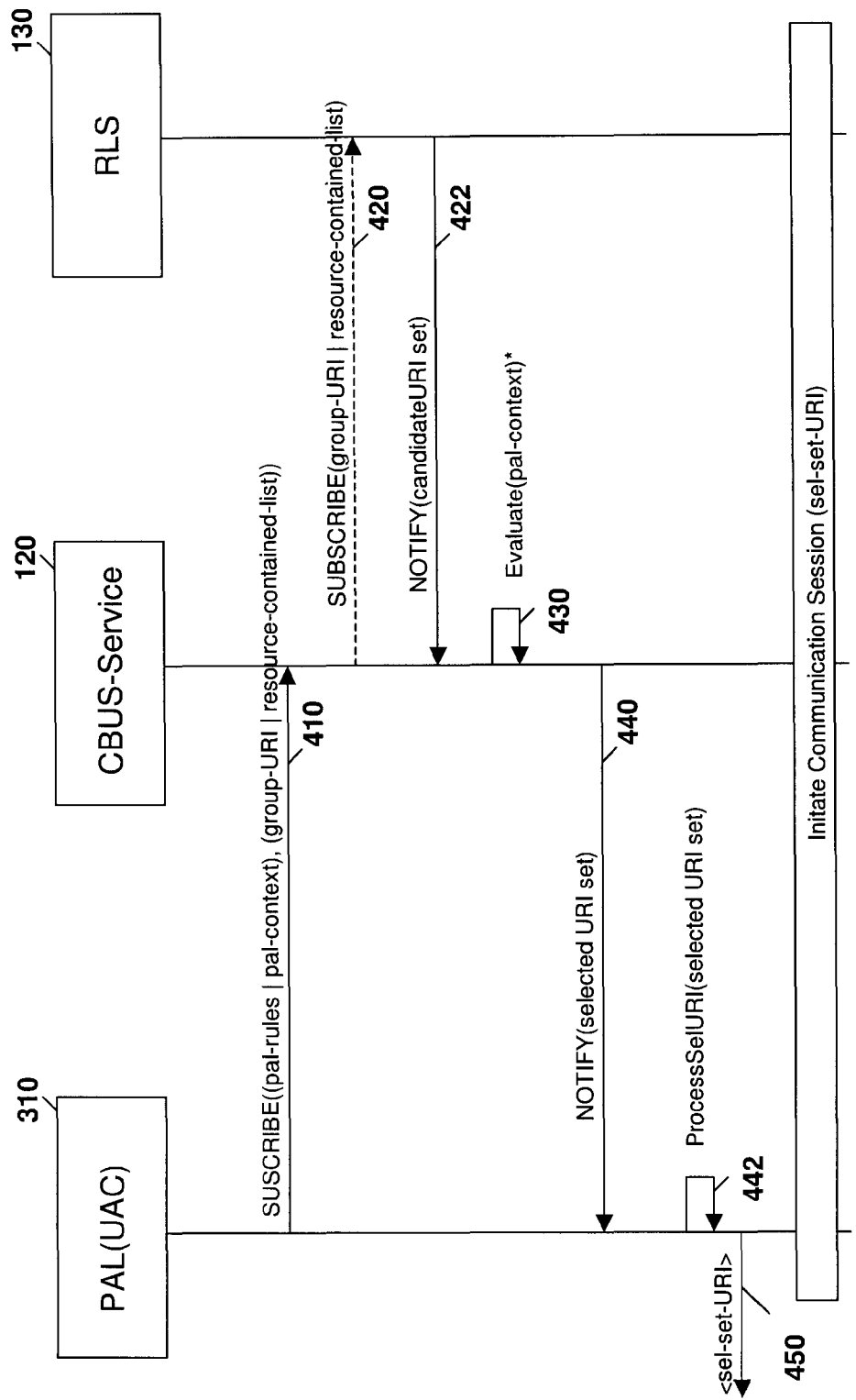
FIG. 4 is a data flow diagram showing processing of selected URI sets in which the user agent client is a presence abstraction layer and in which a subscription protocol is utilized.

Instead of using a REFER procedure, a PAL (UAC) 310 may use a direct subscription. Reference is now made to FIG. 4.

In FIG. 4 PAL (UAC) 310 communicates with CBUS-service 120. CBUS-service 120 further communicates with RLS 130.

A subscription message 410 is provided from PAL (UAC) 310 to CBUS-service 120. The subscription message 410 includes rules and/or context. The subscribe message 410 further includes either a group URI or a resource-contained-list.

Responsive to the receipt of subscription message 410, CBUS-service 120 provides a subscription 420 to RLS 130 in which the group URI or resource-contained-list is provided to RLS 130. RLS 130 aggregates the information based on the group URI or resource contained list and provides a notification 422 back to CBUS-service 120.

CBUS-service 120, upon receiving the notification 422, evaluates the candidate URI set, as shown by arrow 430. The evaluation at arrow 430 is similar to the evaluation at arrow 340 of FIG. 3. Specifically, the evaluation at arrow 430 utilizes the context and/or rules provided within subscription message 410 by PAL (UAC) 310, in order to evaluate the candidate URI set. As with arrow 340, in an alternative embodiment the evaluation as shown by arrow 430 could involve communication between CBUS-service 120 and PAL (UAC) 310 wherein the raw presence data is provided from CBUS-service 120 to PAL 310 to allow PAL 310 to process the presence information based on overt rules and/or context, and return the various presence aspects to CBUS-service 120.

CBUS-service 120 sends the results of the evaluation at arrow 430 to PAL (UAC) 310, shown by notification 440. Notification 440 includes the selected URI set which is then processed, as shown by arrow 442 and a processed selected set URI may be returned to a user or communication service, as shown by arrow 450. Further, PAL (UAC) 310 may execute further actions based for example on the selected URI set notification received as all or part of the PAL presence aspect 'eligible-session-participants' (i.e. certain presentities matching specified criteria as set out by the subscription message 410). In this scenario, PAL (UAC) 310 may execute a specified action based on rules (e.g. transform the selected URI set into a vCard list for later sharing as a Microsoft Outlook contact list) on behalf of a requesting user.

The UAC 210 or PAL (UAC) 310 may be located in various processing elements on a network. In one embodiment, the UAC 210 may be part of a communication client on a user's mobile device. In other embodiments, the UAC or PAL (UAC) may be a logical process within a network, either as a dedicated server such as a presence access layer, abstraction layer or context aware mechanism, or may be co-located with a CBUS or RLS server.

In a further embodiment, UAC 210 or PAL (UAC) 310 may be part of, or be distributed within smaller components over an instant messaging, push-to-talk over cellular presence conference call server, CBUS and/or a location server.

In a further embodiment, the UAC may be broken into logical components that are distributed among the various options above, including part on a mobile device or on a network element.

Figure 5:
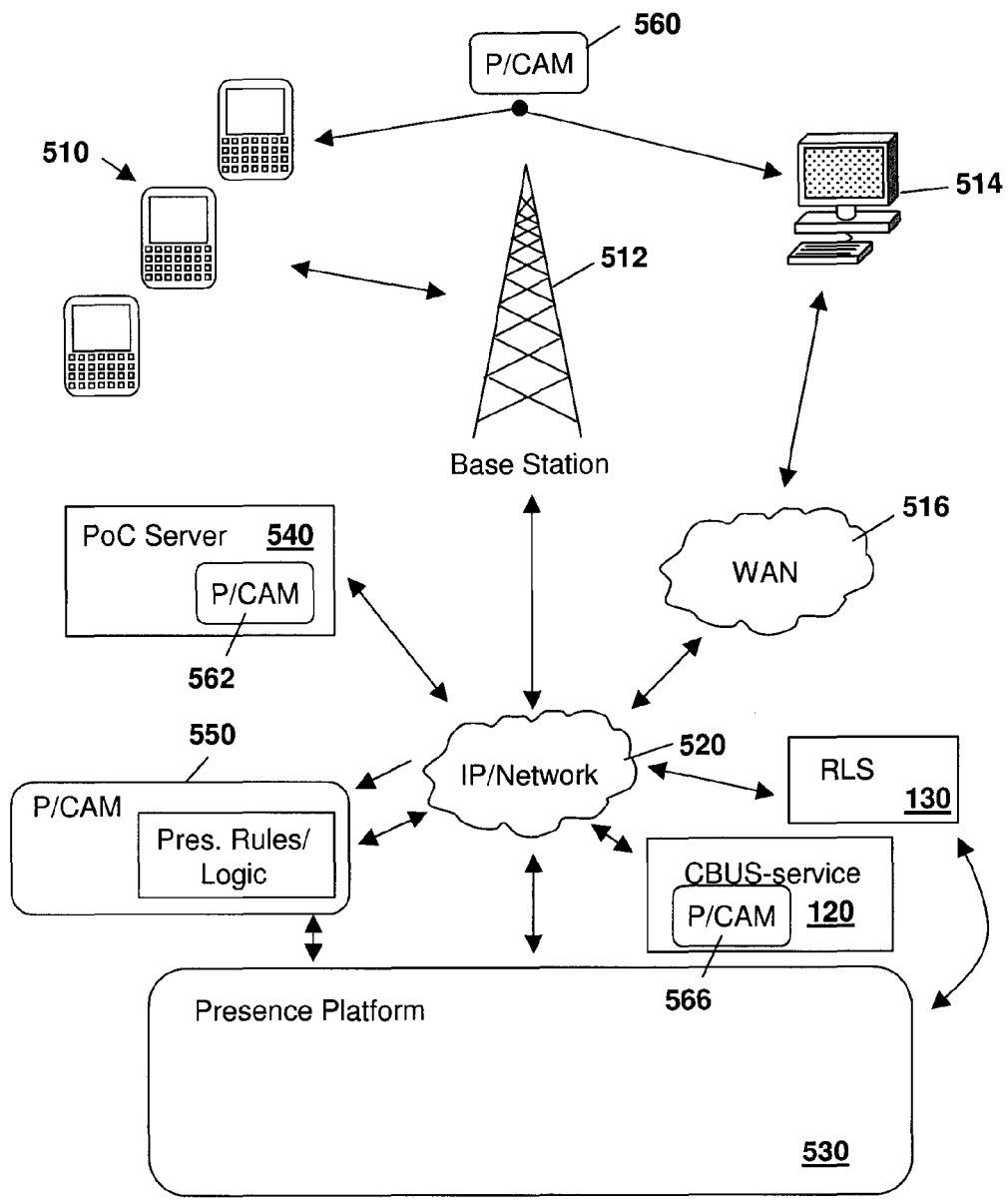
FIG. 5 is a block diagram showing an exemplary system in which the presence aware layer is distributed amongst various system components.

Reference is now made to FIG. 5. FIG. 5 shows a system similar in which the Presence Aware Layer utilizes P/CAM functionality that has been distributed through P/CAM agents on various devices.

Specifically, user devices 510 communicate through a base station 512 with network 520. Further, a desktop 514 (e.g., a computing device that is similar or different than user devices 510) communicates over a wide area network 516 with network 520.

A presence platform 530 is adapted to store raw data and state updates that are received from clients.

Further, a PoC server 540 is adapted to communicate with network 520 and publish or consume states on behalf of client applications.

The context aware layer embodied as a P/CAM server 550 is configured to communicate with network 520 and to receive and/or establish context, policy, rules and thresholds and provide and receive presence aspect request and responses to and from clients such as user devices 510, CBUS-service 120 and desktop 514 through P/CAM agent 560 or PoC server 540 through P/CAM agent 562. In one embodiment, CBUS service 120 includes a P/CAM agent 566 that may be responsible for invoking or executing PAL rules and/or context.

P/CAM 550 is further adapted to communicate with presence platform 530 to receive and send presence information flow.

In the embodiment of FIG. 5, some of the functionality of P/CAM server 550 may be distributed in order to allow the full functionality of the P/CAM, or part of it, to be performed on the device 510, desktop 514 or PoC server 540, for example. This is illustrated by P/CAM agent 560 on user devices 510 or desktop 514 and P/CAM agent 562 on PoC server 540. In this case, the context aware layer comprises both P/CAM server 550 and P/CAM agent 560 and/or 562.

P/CAM agent 560 or 562 could contain rules and/or policies that are predefined. Further, the P/CAM agent 560 or 562 can be used to manipulate presence information or interoperate with metadata or clients on the host execution environment in some embodiments.

As will be appreciated, in some embodiments the entire P/CAM can be located on a client or other server.

Rather that a PAL and P/CAM, a location aware layer and L/CAM, or generic aware layer and generic x/CAM may be utilized.

In the case of FIG. 5, the P/CAM server 550, P/CAM agent 560 562, and 566 may also be (either individually or in combination with one another) the user agent client (UAC) for CBUS-service communication (i.e. for initiating a subscription message 410 as shown in FIG. 4). The devices having the UAC would typically include a computer readable medium for storing instructions which implement the processes of FIGS. 2 to 4. The computer readable storage medium may be a tangible or intransitory/non-transitory medium such as optical (e.g. CD, DVD, etc.), magnetic (e.g., tape) or other memory known in the art.

The above therefore provides for the initiation and definition of a resource contained or group address towards a CBUS service, with a set of rules and/or context for expressing how to consolidate or match conditions through a CBUS service 120. A server of a CBUS service 120 may be configured to perform the processes of FIGS. 2 to 4. Further, a server of CBUS service 120 may include a computer readable medium for storing instructions which implement the processes of FIGS. 2 to 4. The computer readable storage medium may be a tangible or intransitory/non-transitory medium such as optical (e.g. CD, DVD, etc.), magnetic (e.g., tape) or other memory known in the art.

In one embodiment, the CBUS service may directly execute rules or indirectly execute rules relative to a context established and provided to the CBUS.

In a further embodiment, a subscription may be initiated from the UAC for a resource contained or group address on behalf of the evaluating service such as a CBUS.

In a further embodiment, the initial or updated set of selected or target URIs are received and processed on behalf of a user's service.

In a further embodiment, local policy or predefined rules may be used to perform actions.

Further, the above provides for optional monitoring capabilities for ongoing communication dialogues for providing interworking to ensure that a user is not added or removed to a non-existent or terminated session. Further, the above provides for the provision of a client with a means to manipulate and/or effect the resulting ad-hoc or target list without involving or invoking evaluation mechanisms, which permits out-of-band changes or conditions to effect the ad-hoc group.

The above further permits the use of operations outside of the initiating communication sessions by a user client or service such as the review of snapshot or current ad-hoc list and the manipulation of the ad-hoc list through some temporary or persistent storage such as an XDM group document.

The above further provides a mechanism by which a UAC configured as a PAL service is able to solve the problem of establishing session partners. For example, the UAC configured as a PAL service may establish aspects, such as 'eligile-session-participant' for the PAL service.

Figure 6:
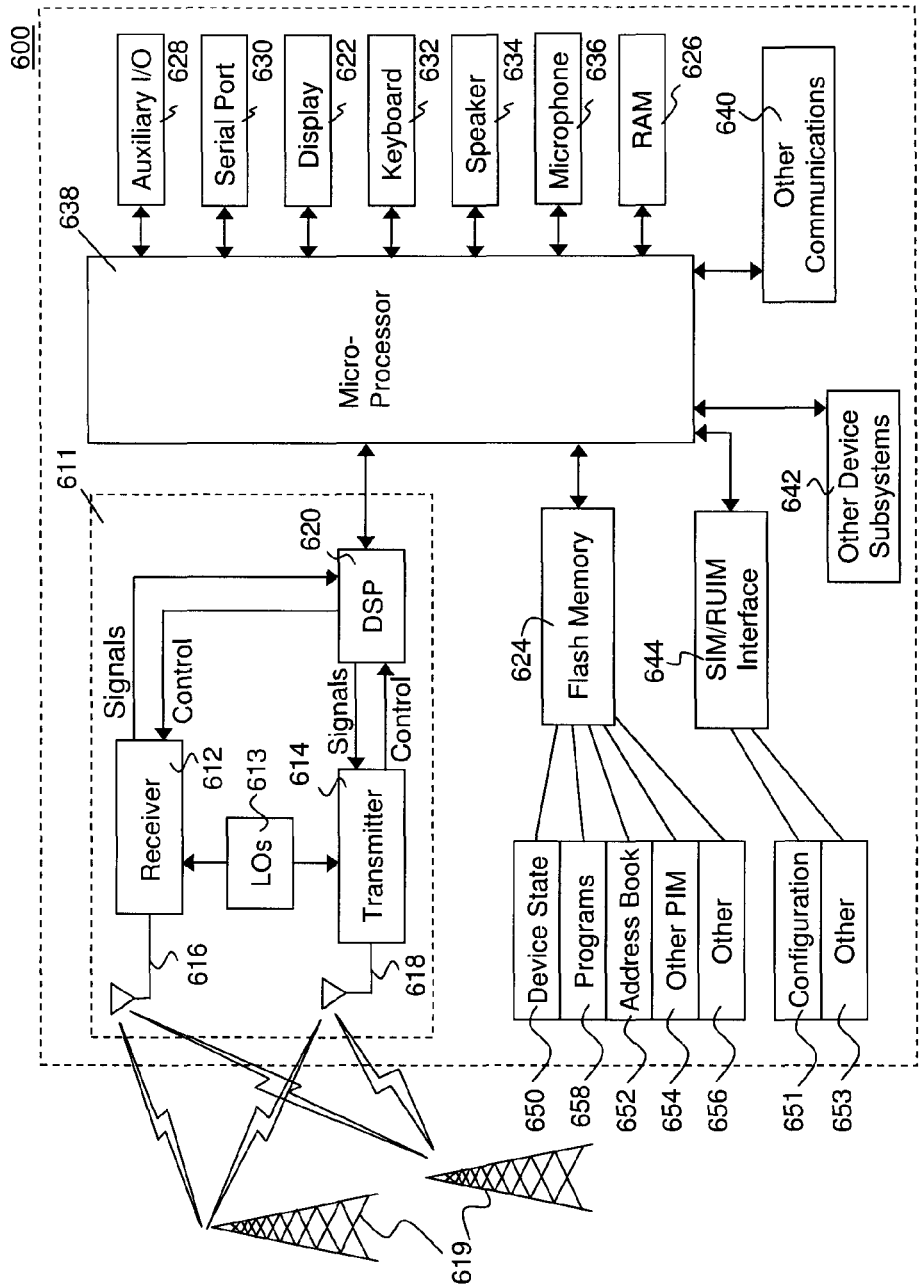
FIG. 6 is a block diagram of an exemplary mobile device capable of being used with the present systems and methods.

If the above is utilized with a mobile device, any mobile device may be used. FIG. 6 is a block diagram illustrating a mobile device capable of being used with the embodiments of the apparatus and method of the present disclosure. Mobile device 600 is typically a two-way wireless communication device having voice and data communication capabilities. Mobile device 600 generally has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile device 600 is enabled for two-way communication, it incorporates a communication subsystem 611, including both a receiver 612 and a transmitter 614, as well as associated components such as one or more, generally embedded or internal, antenna elements 616 and 618, local oscillators (LOs) 613, and a processing module such as a digital signal processor (DSP) 620. As will be apparent to those skilled in the field of communications, the particular design of the communication subsystem 611 will be dependent upon the communication network in which the device is intended to operate.

Network access requirements will also vary depending upon the type of network 619. In some CDMA networks network access is associated with a subscriber or user of mobile device 600. A CDMA mobile device may have a removable user identity module (RUIM) or a subscriber identity module (SIM) card in order to operate on a CDMA network. The SIM/RUIM interface 644 is normally similar to a card-slot into which a SIM/RUIM card can be inserted and ejected like a diskette or PCMCIA card. The SIM/RUIM card can hold many key configurations 651, and other information 653 such as identification, and subscriber related information.

When network registration or activation procedures have been completed, mobile device 600 may send and receive communication signals over the network 619. As illustrated in FIG. 6, network 619 can consist of multiple base stations communicating with the mobile device. For example, in a hybrid CDMA 1x EVDO system, a CDMA base station and an EVDO base station communicate with the mobile device and the mobile device is connected to both simultaneously. The EVDO and CDMA 1x base stations use different paging slots to communicate with the mobile device.

Signals received by antenna 616 through communication network 619 are input to receiver 612, which may perform such common receiver functions as signal amplification, frequency down conversion, filtering, channel selection and the like, and in the example system shown in FIG. 6, analog to digital (A/D) conversion. ND conversion of a received signal allows more complex communication functions such as demodulation and decoding to be performed in the DSP 620. In a similar manner, signals to be transmitted are processed, including modulation and encoding for example, by DSP 620 and input to transmitter 614 for digital to analog conversion, frequency up conversion, filtering, amplification and transmission over the communication network 619 via antenna 618. DSP 620 not only processes communication signals, but also provides for receiver and transmitter control. For example, the gains applied to communication signals in receiver 612 and transmitter 614 may be adaptively controlled through automatic gain control algorithms implemented in DSP 620.

Mobile device 600 typically includes a microprocessor 638 which controls the overall operation of the device. Communication functions, including data and voice communications, are performed through communication subsystem 611. Microprocessor 638 also interacts with further device subsystems such as the display 622, flash memory 624, random access memory (RAM) 626, auxiliary input/output (I/O) subsystems 628, serial port 630, one or more keyboards or keypads 632, speaker 634, microphone 636, other communication subsystem 640 such as a short/long-range communications subsystem and any other device subsystems generally designated as 642. Serial port 630 could include a USB port or other port known to those in the art.

Some of the subsystems shown in FIG. 6 perform communication-related functions, whereas other subsystems may provide "resident" or on-device functions. Notably, some subsystems, such as keyboard 632 and display 622, for example, may be used for both communication-related functions, such as entering a text message for transmission over a communication network, and device-resident functions such as a calculator or task list.

Operating system software used by the microprocessor 638 may be stored in a persistent store such as flash memory 624, which may instead be a read-only memory (ROM) or similar storage element (not shown). Those skilled in the art will appreciate that the operating system, specific device applications, or parts thereof, may be temporarily loaded into a volatile memory such as RAM 626. Received communication signals may also be stored in RAM 626.

As shown, flash memory 624 can be segregated into different areas for both computer programs 658 and program data storage 650, 652, 654 and 656. These different storage types indicate that each program can allocate a portion of flash memory 624 for their own data storage needs. Microprocessor 638, in addition to its operating system functions, may enable execution of software applications on the mobile device. A predetermined set of applications that control basic operations, including data and voice communication applications for example, may be installed on mobile device 600 during manufacturing. Other applications could be installed subsequently or dynamically.

Flash memory 624, or any other computer readable storage medium, may store a user agent client and instructions for implementing the process of FIGS. 2 to 4.

One software application may be a personal information manager (PIM) application having the ability to organize and manage data items relating to the user of the mobile device such as, but not limited to, e-mail, calendar events, voice mails, appointments, and task items. One or more memory stores may be available on the mobile device to facilitate storage of PIM data items. Such PIM application may have the ability to send and receive data items, via the wireless network 619. In one embodiment, the PIM data items are seamlessly integrated, synchronized and updated, via the wireless network 619, with the mobile device user's corresponding data items stored or associated with a host computer system. Further applications may also be loaded onto the mobile device 600 through the network 619, an auxiliary I/O subsystem 628, serial port 630, short/long-range communications subsystem 640 or any other suitable subsystem 642, and installed by a user in the RAM 626 or a non-volatile store (not shown) for execution by the microprocessor 638. Such flexibility in application installation increases the functionality of the device and may provide enhanced on-device functions, communication-related functions, or both. For example, secure communication applications may enable electronic commerce functions and other such financial transactions to be performed using the mobile device 600.

In a data communication mode, a received signal such as a text message or web page download will be processed by the communication subsystem 611 and input to the microprocessor 638, which may further process the received signal for element attributes for output to the display 622, or alternatively to an auxiliary I/O device 628.

A user of mobile device 600 may also compose data items such as email messages for example, using the keyboard 632, which may be a complete alphanumeric keyboard or telephone-type keypad, in conjunction with the display 622 and possibly an auxiliary I/O device 628. Such composed items may then be transmitted over a communication network through the communication subsystem 611.

For voice communications, overall operation of mobile device 600 is similar, except that received signals would preferably be output to a speaker 634 and signals for transmission would be generated by a microphone 636. Alternative voice or audio I/O subsystems, such as a voice message recording subsystem, may also be implemented on mobile device 600. Although voice or audio signal output is generally accomplished primarily through the speaker 634, display 622 may also be used to provide an indication of the identity of a calling party, the duration of a voice call, or other voice call related information for example.

Serial port 630 in FIG. 6 would normally be implemented in a personal digital assistant (PDA)-type mobile device for which synchronization with a user's desktop computer (not shown) may be desirable, but is an optional device component. Such a port 630 would enable a user to set preferences through an external device or software application and would extend the capabilities of mobile device 600 by providing for information or software downloads to mobile device 600 other than through a wireless communication network. The alternate download path may for example be used to load an encryption key onto the device through a direct and thus reliable and trusted connection to thereby enable secure device communication. As will be appreciated by those skilled in the art, serial port 630 can further be used to connect the mobile device to a computer to act as a modem.

Other communications subsystems 640, such as a short/long-range communications subsystem, is a further optional component which may provide for communication between mobile device 600 and different systems or devices, which need not necessarily be similar devices. For example, the subsystem 640 may include an infrared device and associated circuits and components or a Bluetooth™ communication module to provide for communication with similarly enabled systems and devices. Subsystem 640 may also be used for WiFi and/or WiMax communications.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method for managing a target list on behalf of a user agent client comprising:
    receiving a request from the user agent client, the request containing at least one uniform resource identifier identifying a resource, the request further containing evaluating conditions relating to at least one of presence and location of the resource;
    providing a subscription request to an information owning enabler, the information owning enabler managing contextual information for a plurality of resources;
    receiving a notification including a candidate uniform resource indicator set;
    retrieving at least one of presence data and location data for each element of the candidate uniform resource indicator set;
    evaluating the candidate uniform resource indicator set to create a selected uniform resource indicator set, the selected uniform resource indicator set comprising elements of the candidate uniform resource indicator set which satisfies the evaluating conditions;
    notifying the user agent client of the selected uniform resource indicator set;
    establishing a communication session with members of the selected uniform resource indicator set;
    receiving an updated notification providing a modified candidate uniform resource indicator set;
    re-evaluating the modified candidate uniform resource indicator set;
    providing a delta selected uniform resource indicator set to the user agent client; and
    processing the delta selected uniform resource indicator set at the user agent client and providing an updated selection set to a receiver, wherein the processing utilizes policy or predefined rules to determine an action to be performed based on the delta uniform resource indicator set.

2. The method of claim 1, wherein the evaluating conditions direct the evaluation by providing a set of rules for establish criteria for matching or selecting members of the target list, or by providing context for consolidating or matching conditions.

3. The method of claim 1, wherein the request from the user agent client contains a uniform resource indicator comprising a group identifier.

4. The method of claim 1, wherein the user agent client is a presence aware layer.

5. The method of claim 4, wherein the request received from the user agent client contains presence aware rules and context and wherein the evaluation utilizes the presence aware rules and context.

6. The method of claim 1, wherein the information owning enabler is one of a Condition Based Uniform Resource Identifier Selection enabler, a resource list server and a presence SIMPLE server.

7. The method of claim 1, further comprising processing the selected uniform resource indicator set at the user agent client and providing a selection set to a recipient, wherein the recipient is one of a user device or a communications service.

8. The method of claim 1, further comprising receiving, at the user agent client, a modified selection set, the method further comprising processing the modified selection set and creating a revised selection set.

9. The method of claim 8, further comprising sending an update from the user agent client after said processing is complete.

10. The method of claim 1, wherein the subscription request received from the user agent client is an Internet Engineering Task Force (IETF) REFER message, and wherein the notifying the user agent client is linked to the REFER message.

11. A network apparatus comprising:
    a processor; and
    a communication subsystem;
    wherein the processor and communication subsystem cooperate to implement a server, the server being configured to:
        receive a request from the user agent client, the request containing at least one uniform resource identifier identifying a resource, the request further containing evaluating conditions relating to at least one of presence and location of the resource;
        provide a subscription request to an information owning enabler, the information owning enabler managing contextual information for a plurality of resources;
        receive a notification including a candidate uniform resource indicator set;
        retrieve at least one of presence data and location data for each element of the candidate uniform resource indicator set;
        evaluate the candidate uniform resource indicator set to create a selected uniform resource indicator set, the selected uniform resource indicator set comprising elements of the candidate uniform resource indicator set which satisfies the evaluating conditions;
        notify the user agent client of the selected uniform resource indicator set;
        establish a communication session with members of the selected uniform resource indicator set;
        receive an updated notification providing a modified candidate uniform resource indicator set;
        re-evaluate the modified candidate uniform resource indicator set;
        provide a delta selected uniform resource indicator set to the user agent client; and
        process the delta selected uniform resource indicator set at the user agent client and provide an updated selection set to a receiver, wherein the processing utilizes policy or predefined rules to determine an action to be performed based on the delta uniform resource indicator set.

* * * * *